United States Patent [19]
Alworth et al.

[11] Patent Number: 5,220,880
[45] Date of Patent: Jun. 22, 1993

[54] METHOD AND APPARATUS FOR MAINTAINING LIVE FISH DURING TRANSPORTATION AND STORAGE

[75] Inventors: Lance D. Alworth, 990 Highland Dr., Ste. 300, Solana Beach, Calif. 92075; James R. Bass, Jr., Solana Beach, Calif.

[73] Assignee: Lance Alworth, Solana Beach, Calif.

[21] Appl. No.: 970,169

[22] Filed: Nov. 2, 1992

[51] Int. Cl.$^5$ .............................................. A01K 61/00
[52] U.S. Cl. .............................................................. 119/3
[58] Field of Search ................. 119/3, 5; 43/54.1, 57; 220/426, 428, 466, 469, 501; 206/205

[56] References Cited

U.S. PATENT DOCUMENTS

| | | | |
|---|---|---|---|
| 2,663,117 | 12/1953 | Ederer | 119/3 |
| 3,584,602 | 6/1971 | Stasio | 119/5 |
| 5,117,777 | 6/1992 | Takasuei | 119/3 |

*Primary Examiner*—Gene Mancene
*Assistant Examiner*—Thomas Price
*Attorney, Agent, or Firm*—Brown, Martin, Haller & McClain

[57] ABSTRACT

A cylinder is made of opaque material with a diameter slightly larger than the largest cross-section of the fish to be stored. Water is introduced directly into the cylinder or into a chamber which can either be attached to the outside of the cylinder or is created by placing the cylinder inside a larger diameter outer cylinder. The water enters the cylinder through perforations at a first end. The chamber may be positioned to stand vertically or horizontally with a water inlet tube and a water outlet tube through the side wall at its second end. A funnel or cone, which may have one or more perforations, is suspended pointing toward the second end within the cylinder a short distance from its second end. The incoming water flows through the perforations in the second end of the cylinder and up through the funnel perforations. As the cylinder fills, water will exit the cylinder through an outlet tube located near the first end of the cylinder. In one embodiment, a perforated baffle placed within the chamber breaks up air bubbles which may be present in the incoming water. The fish is placed facing toward the funnel and is centered in the cylinder by cradling its nose in the funnel. A cap may be fitted on the first end of the cylinder to retain water therein when it is positioned horizontally.

33 Claims, 2 Drawing Sheets

METHOD AND APPARATUS FOR MAINTAINING LIVE FISH DURING TRANSPORTATION AND STORAGE

BACKGROUND OF THE INVENTION

Transportation and storage of live fish has traditionally involved storage tanks which require large volumes of water and are therefore very heavy. More recent inventions have described methods which utilize small amounts of water which only partially cover the fish in shallow trays together with the introduction of highly oxygenated air into the closed container (see U.S. Pat. No. 4,455,966). This method and others are suited for smaller fish such as tropical aquarium fish, young fish for stocking lakes and ponds, and small bait fish.

Live transportation and storage of large bait fish pose a special problem. Larger fish are more likely to suffer the effects of stress from struggling to breathe while confined. This is especially true for sport fishing boats which may have difficulty handling the weight of large water tanks, but must have some way of keeping large bait fish healthy in order to catch bonita, yellow and blue fin tuna, marlin and other big game and food fish which are only attracted to larger live bait.

Issues of storage of larger live fish are also encountered in tournament fishing or in weighing of record-size fish where it is desirable to keep the fish alive until an official weighing can be made.

The desired storage situation for either large or small fish is one in which the fish is confined to prevent it from injuring or exhausting itself by thrashing around and is in a sufficient amount of highly aerated water to enable the fish to breathe comfortably, yet not so much water that the weight of the storage apparatus is prohibitive.

SUMMARY OF THE INVENTION

It is an advantage of the present invention to provide a new and improved method and apparatus for maintaining live fish during transportation and storage which restricts the movement of the fish which is substantially immersed in water. The water is highly aerated, permitting the fish to breathe with little effort.

In an exemplary embodiment of the present invention, an inner cylinder made of opaque material with a diameter slightly larger than the largest cross-section of the fish to be stored is placed inside a larger diameter outer cylinder so that water introduced into the space between the inner and outer cylinders can enter the inner cylinder through perforations at its lower end. The outer cylinder is positioned to stand vertically on its bottom end which is closed except for a water inlet tube and a water outlet tube which run through the side wall at the bottom end. The inlet tube runs up the inside of the space between the cylinders and terminates near the top of the cylinders. Water is pumped into the outer cylinder through the inlet tube so that a stream of water is forced downward through the space between the cylinders. A perforated funnel or cone is suspended pointing downward within the inner cylinder a short distance above its bottom. The incoming water flows through the perforations in the bottom of this inner cylinder and up through the funnel perforations. As the inner cylinder fills, water will exit the cylinder through an outlet tube located near the open upper edge of the inner cylinder. A perforated baffle placed within the space between the cylinders breaks up air bubbles which may be present in the incoming water. The fish is placed face down in the cylinder and is centered in the cylinder by cradling its nose in the funnel. Alternatively, the cylinders can be placed horizontally with the upper end capped with the fish still facing the funnel. The constant stream of water entering the inner cylinder through perforated funnel causes the water to flow past the fish's gills to provide oxygen-enriched water for breathing. The vertical suspension of the fish provides easy access to the fish by the angler, avoiding the possibility of being bitten by the fish or jabbed by its spines, and also eliminating the chase to catch the fish.

A second embodiment comprises a single cylinder with a perforated funnel suspended close to the lower end, as in the first embodiment, and does not have a baffle as in the first embodiment. A chamber is affixed to the outer side of the cylinder. Openings in the cylinder wall at its lower end provide fluid communication between the chamber and the cylinder. An inlet tube enters the chamber at its lower end and continues to the upper end of the chamber. As the chamber fills, water enters the cylinder flowing upward from the openings and through the perforations in the funnel. A fish placed facing the funnel will have water forced into its mouth and through its gills so that it can breathe. An outlet at the top of the cylinder allows water to escape the nearly filled cylinder. An outlet tube conducts the water back down to the bottom of the chamber or tank outside of the apparatus.

In a third embodiment, a single cylinder has a funnel affixed at the bottom of its interior. The cylinder diameter is slightly larger than the largest cross-sectional diameter of the fish to be stored. A water inlet tube enters the bottom of the cylinder and is connected to the end of the funnel so that incoming water is forced up into the funnel and into the fish's mouth to oxygenate its gills. The water flows past the fish to the opposite end of the cylinder where an outlet is located below the end of the cylinder. The water is carried by an outlet tube to a drain or recycling tank.

If the fish is much smaller than the inner dimension of the cylinder, an inner sleeve which more closely fits the cross-sectional diameter of the fish can be inserted into the cylinder to assure that the fish is under close confinement. The stream of water is forced into the fish's face, practically doing the breathing for it. The fish is maintained in a low light condition with minimal stress on and exertion by the fish.

BRIEF DESCRIPTION OF THE DRAWINGS

A better understanding of the present invention will be provided by consideration of the following detailed description of the preferred embodiment of the present invention, taken in conjunction with the accompanying drawings, in which like reference numerals refer to like parts and in which.

DESCRIPTION OF THE PREFERRED EMBODIMENT

Figure 1:
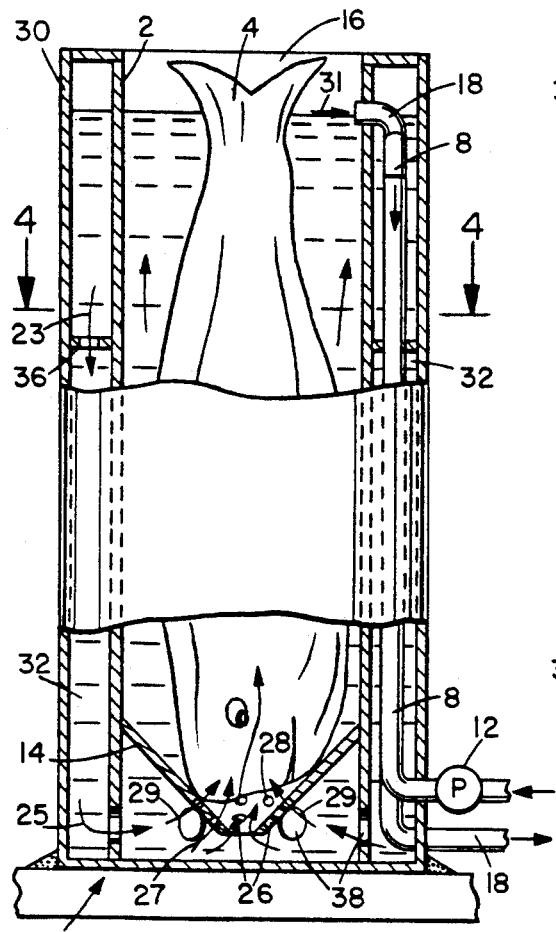
FIG. 1 is a side view, partially cut away, of the apparatus for of storing live fish.
Figure 4:
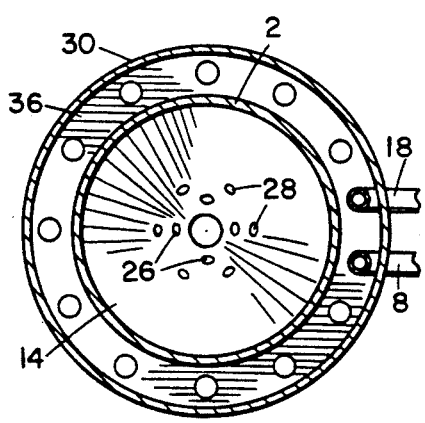
FIG. 4 is a cross-sectional view taken along line 4—4 of FIG. 1.

Referring to FIGS. 1 and 4, an inner cylinder 2 has an inner diameter slightly larger than the largest cross-sectional dimension of the live fish 4 to be stored. The diameter of the cylinder 2 is selected to allow the fish to fit inside easily while significantly limiting its mobility. The lower end 6 of the cylinder 2 is generally closed but has a number of perforations 26 through the cylinder sides near the first end 6. Attached or wedged within inner cylinder 2 is funnel 14 which has at least one set of perforations. Here, the funnel 14 is shown with two sets of perforations 26 and 28. Surrounding cylinder 2 is outer cylinder 30 to form a space 32 between the two cylinders. Inlet tube 8 and outlet tube 18 run from the bottom end of outer cylinder 30 to its top. Incoming water is forced into inlet tube 8 by a pump 12 which draws water from a source, either a nearby body of water, such as the ocean, or a tank, causing the water to flow into the space 32 through perforations 38, 26 and 28 up into cylinder 2, as indicated by flow direction arrows 25, 27 and 29, respectively.

Funnel 14 is placed with its apex pointing downward toward the bottom of the cylinder 2. It is suspended either by glued or welded attachment, means or is wedged into the cylinder 2 due to its shape and diameter which is closely fitted to the inner diameter of cylinder 2. The funnel 14 acts to cradle the nose of the fish 4 and keep it in the center of the tube so that at least a portion of the incoming stream of water is forced past the fish's gills. Perforations 26 provide water flow directly towards the fish's face (flow direction 27) while perforations 28 are situated higher to cause water to flow to the back sides of the fish's gills along flow direction 29. The incoming water fills the cylinder 2 so that it substantially covers the body of the fish 4. After the cylinder 2 is full, water exits through an outlet tube 18 located on the side near the second, top end 16 of the cylinder 2, along flow direction 31. The exiting water is drawn back down the spacing 32 and out of cylinder 30. The drained water may be directed to a drain or recirculated through the pump 12. Top end 16 is open to allow easy access for insertion or removal of the fish 4.

A perforated baffle 36, illustrated in FIG. 4, is inserted within the space 32 so that incoming water passes through it before entering inner cylinder 2, following flow direction 23. This breaks up any bubbles that might be present within the incoming water so that the fish is not exposed to potentially harmful air bubbles.

The incoming stream of water is of sufficient flow rate to gently suspend the fish 4 as it rests face down in the cylinder 2. The pumping velocity is variable and can be adjusted in accordance with the size of the fish. The funnel 14 keeps the fish 4 directed toward the center of the cylinder 2 even as the fish is suspended. The stream of water aerates the water with its turbulence, the aerated water being gently forced into the fish's mouth or over its gills so that it can breathe without effort. Struggling for air and thrashing around is minimized so the fish remains healthy.

Stress on the fish is further reduced by forming the inner cylinder 2 from an opaque material, such as polyvinyl chloride (PVC) or other similar plastic which is colored or painted black on at least one surface to create a low light condition for the fish.

Access is facilitated by vertically suspending the fish tail up. The angler can grab the fish by its tail, avoiding being bitten or jabbed with the fish's spines. Also, stress on both the fish and the fisherman is reduced because there is no need to chase the fish in order to catch it, and the fish is separated from other fish avoiding collisions between many fish in a small tank.

Figure 5:
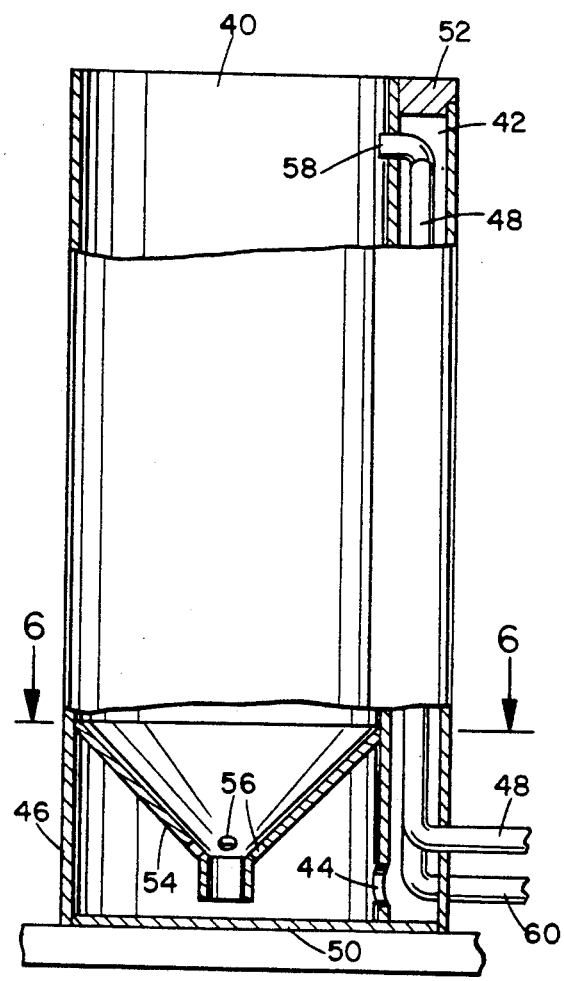
FIG. 5 is a side view, partially cut away, of a second embodiment of the apparatus.
Figure 6:
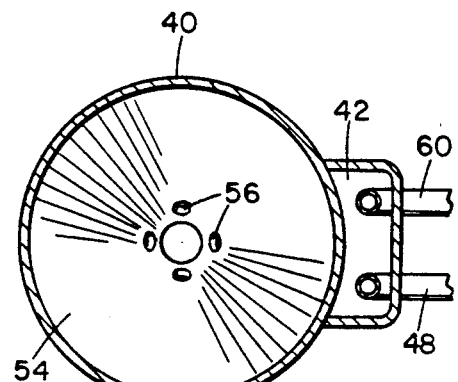
FIG. 6 is a cross-sectional view taken along line 6—6 of FIG. 5.

In a second embodiment illustrated in FIGS. 5 and 6, the function of the space 32 of the first embodiment is provided by chamber 42 which is attached with a water tight seal to the outside of cylinder 40. A plurality of openings 44 through the wall of cylinder 40 at its lower end 46 permits water to flow from chamber 42 into the cylinder 40.

Inlet tube 48 enters the chamber 42 at its lower end 50 and runs upward until it ends slightly below the top 52 of the chamber 42. Water flows out of inlet tube 48 to begin filling chamber 42. As chamber 42 is filled, water flows through openings 44, filling cylinder with water flowing upward.

A perforated funnel 54 is suspended within cylinder 40 slightly above the cylinder bottom. Water flows through the perforations 56 where it provides oxygen to the fish placed therein. Water is drained from the cylinder 40 by water outlet 58 through the wall of cylinder 40 leading to water tube 60. Water tube 60 runs down to the lower end 50 of chamber 40 and out through its outer wall to a drain or water tank.

At least one perforation may be desirable in the top 52 of chamber 42 to allow venting to prevent the build-up of a vacuum within the chamber 42 due to the water flow. As with the first embodiment, the pumping velocity is variable and can be adjusted to the size of the fish. Funnel 54 keeps the fish directed toward the center of the cylinder. The walls of the cylinder 40 are dark and opaque to create a low light condition for the fish.

Figure 7:
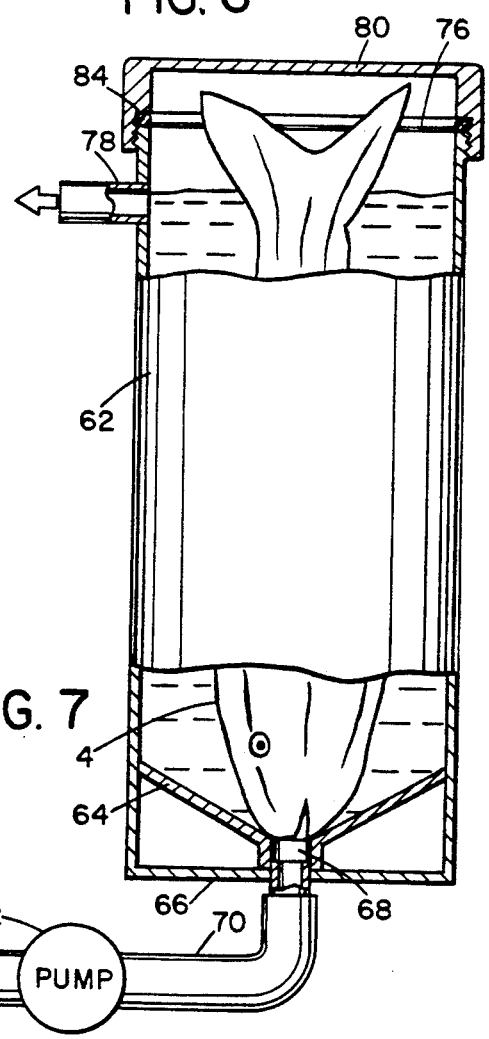
FIG. 7 is a side view, partially cut away, of a third embodiment of the apparatus.

A third embodiment illustrated in FIG. 7 comprises a single cylinder 62 which has a funnel 64 affixed in the bottom end 66 of the cylinder 62. The funnel 64 may have a number of perforations therein, as in the previous embodiments, however, as illustrated in FIG. 7, the water is introduced into the cylinder only through the end 68 of the funnel 64. Water is pumped by pump 72 through inlet tube 70 into the cylinder 62 at or near the bottom end 66 and into the end 68 of funnel 64 so that water flows into the mouth of the fish 4 which is positioned head down within the cylinder 62. Water flows upward past the body of the fish until it reaches the level at which the outlet tube 78 is connected, near the top 76 of the cylinder. The water then flows out to a drain or tank.

Figure 2:
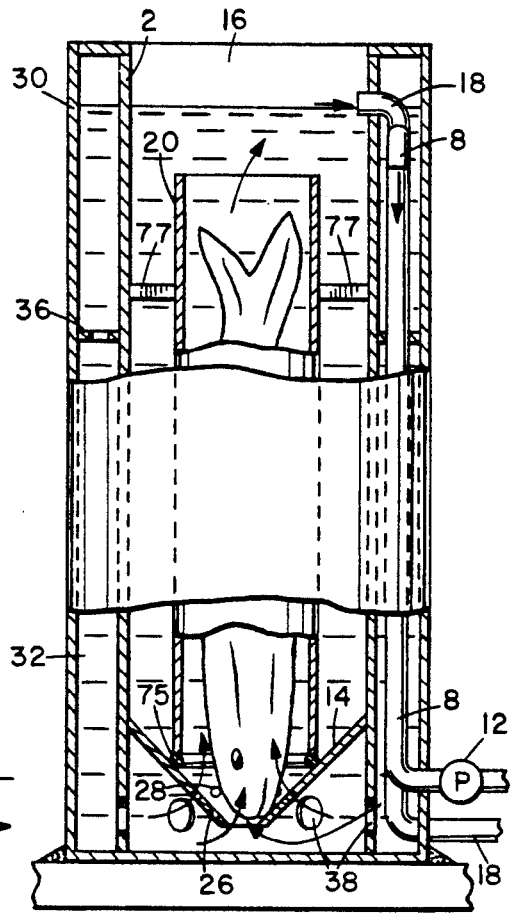
FIG. 2 is a side view, partially cut away, of the apparatus for storing a fish which is substantially smaller than the inner cylinder diameter.

If the fish to be stored is much smaller than the diameter of the cylinder 2, 40 or 62, a smaller diameter tube 20 may be inserted into the cylinder to restrict the smaller fish's movement and to keep the fish centered in the cylinder. Tube 20 may have a rubber or rubber-like seal 75 or o-ring at its lower and where it contacts the funnel. The smaller diameter tube 20 is shown inserted in cylinder 2 in FIG. 2. Spacers 77 consisting of small inserts are placed between tube 20 and cylinder 2 to center the tube 20 and also to prevent tube 20 from floating. Spacers 77 should be elastic to permit their insertion between tube 20 and cylinder 2, but should then grip the walls of each to remain in place.

The vertical configuration of the apparatus makes it easy to place the fish in the container and maintains ready access to the fish when necessary. However, in some situations, for example, for limited space, the cylinders may be fitted with a removable water-tight cap 80 (shown in FIG. 7) to allow the entire assembly to be placed on its side. Water-tight cap 80 may have external or internal threads to match internal or external threads on the cylinder 62, and an o-ring 84 or other flexible seal may be used. The fish's mobility is highly restricted by the close-fitting cylinder 2, 20 or 40 to prevent the fish from injuring or exhausting itself, yet when the fish is needed for bait the fisherman can easily grab the fish by its tail and remove it from the cylinder. The cylinders need not be circular in cross-section. An elliptical or oblong cross-section, for example, will provide smooth sidewalls and even better confinement of a fish which, itself, may be somewhat elliptical in cross-section. Some fish may have different cross-sectional shapes for which the tube shapes can be specifically tailored.

Figure 3:
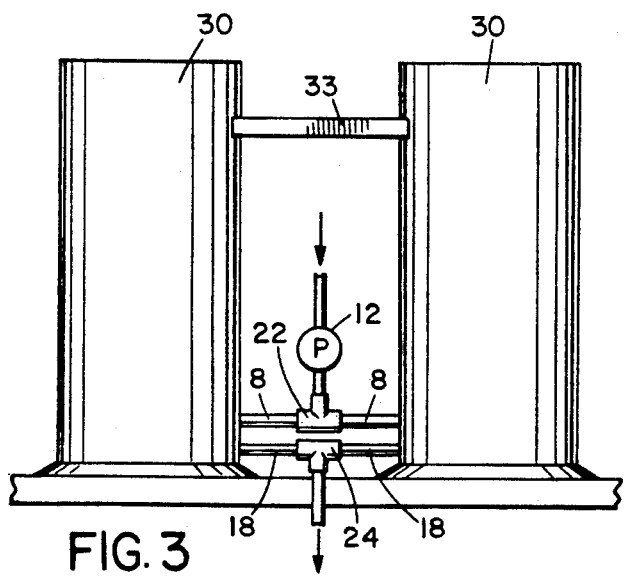
FIG. 3 is a side view of two attached storage devices.

Multiple tubes can be joined together using the same principle of operation by splitting the water inlet and outlet with T-joints 22 and 24, respectively, as shown in FIG. 3. A support bar 33 may also be attached to the outer cylinder 30 to avoid strain on the flow tubes or valves. A multiple apparatus according to the second embodiment and third embodiments can be similarly created.

The present invention provides a method and apparatus for preserving live fish in a healthy condition during storage and transportation without requiring large volume water tanks. The fish's mobility is restricted while it is suspended in low light in a constant stream of aerated water, making the fish's confinement as relaxed as possible under the circumstances.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. An apparatus for maintaining a fish having a plurality of cross-sectional dimensions in a live, healthy condition comprising:
   a substantially cylindrical tube having a first inner diameter, a first outer diameter, a first end, a closed second end and at least one inlet opening at said second end, said first inner diameter being larger than a largest cross-sectional dimension of the fish and said tube having in length which is sufficient to enclose at least a substantial portion of the fish;
   a funnel suspended concentrically within said tube near said second end above said at least one opening;
   a water inlet for introducing incoming water into said tube through said at least one inlet opening and into said at least one opening of said funnel; and
   a water outlet near said first end through which water exits said tube.

2. An apparatus as in claim 1 further comprising:
   a chamber having a first end, a second end, an inner wall and an outer wall for retaining water, said chamber being disposed adjacent said tube so that an outer wall of said tube is at least a portion of said inner wall of said chamber, said chamber being in fluid communication with said tube through said at least one inlet opening.

3. An apparatus as in claim 2 wherein said chamber comprises an elongated box abutting an outer wall of said tube and having a second length substantially the same as said length of said tube.

4. An apparatus as in claim 2 wherein said chamber comprises an outer cylinder surrounding said tube to form said outer wall, said outer cylinder having a second inner diameter larger than said first outer diameter of said tube so that a space is formed between said tube and said outer cylinder, said outer cylinder having a second length substantially the same as said length of said tube.

5. An apparatus as in claim 4 further comprising a perforated baffle disposed within said space.

6. An apparatus as in claim 2 wherein said water inlet includes an inlet tube running from said end of said chamber to said first end.

7. An apparatus as in claim 1 wherein said at least one opening of said funnel comprises a plurality of perforations.

8. An apparatus as in claim 1 wherein said tube is opaque.

9. An apparatus as in claim 1 wherein at least one surface of said tube is dark colored.

10. An apparatus as in claim 1 further comprising an insert cylinder having a second outer diameter smaller than said first inner diameter disposed substantially concentrically within said tube.

11. An apparatus as in claim 1 further comprising a removable cap for releasably sealing said first end.

12. An apparatus as in claim 1 wherein said tube is disposed in a vertical orientation.

13. An apparatus as in claim 1 wherein said tube is disposed in a horizontal orientation.

14. An apparatus for maintaining a fish having a plurality of cross-sectional dimensions in a live, healthy condition comprising:
   a chamber for retaining water, said chamber having a first end, a second end, an inner wall and an outer wall;
   a substantially cylindrical tube adjacent said chamber so that a portion of said tube comprises said inner wall of said chamber, said tube having a length, first inner diameter, a first outer diameter, a first end, a closed second end and a plurality of openings near said closed lower end for fluid communication between said chamber and said tube, said first inner diameter being larger than a largest cross-sectional dimension of the fish and said length being sufficient to enclose at least a substantial portion of said fish;
   a funnel suspended concentrically within said tube near said second end above said plurality of openings, said funnel having a plurality of perforations therein;
   a water inlet for introducing incoming water into said chamber and into said tube through said plurality of openings and said plurality of perforations; and
   a water outlet near said first end through which water exits said tube.

15. An apparatus as in claim 14 wherein said chamber comprises an elongated box abutting an outer wall of said tube and having a second length substantially the same as said length of said tube.

16. An apparatus as in claim 14 wherein said chamber comprises an outer cylinder surrounding said tube to form said outer wall and outer cylinder having a second inner diameter larger than said first outer diameter of said tube so that a space is formed between said tube and said outer cylinder, said outer cylinder having a second length substantially the same as said length of said tube.

17. An apparatus as in claim 16 further comprising a perforated baffle disposed within that space.

18. An apparatus as in claim 14 wherein said water inlet includes an inlet tube running from said second end of said chamber to said first end.

19. An apparatus as in claim 14 wherein said tube is opaque.

20. An apparatus as in claim 14 wherein at least one surface of said tube is dark colored.

21. An apparatus as in claim 24 further comprising an insert cylinder having a second outer diameter smaller than said first inner diameter disposed substantially concentrically within said tube.

22. An apparatus as in claim 14 wherein said tube has a circular cross-section.

23. An apparatus as in claim 14 wherein said tube has an elliptical cross-section.

24. An apparatus as in claim 14 wherein said tube is disposed in a vertical orientation.

25. An apparatus as in claim 14 where said tube is disposed in a horizontal orientation.

26. A method for maintaining a fish having a plurality of cross-sectional dimensions in a live, healthy condition, the method which comprises:
   providing a tube having a first inner diameter larger than a largest cross-sectional dimension of said fish, a first outer diameter, a first end and a second end;
   suspending a funnel having at least one opening within said tube near said second end;
   introducing water into said tube through an inlet opening in said tube;
   forcing a stream of water through said at least one opening in said funnel;
   releasing water from said tube near said first end through an outlet tube; and
   confining said fish within said tube with said fish facing said funnel, so that water is forced past said fish.

27. A method as in claim 26 further comprising:
   providing a chamber having a first end, a second end, an inner wall and an outer wall;
   disposing said tube within a cylinder having a second inner diameter larger than said first outer diameter; and
   forming a space between said tube and said cylinder.

28. A method as in claim 27 wherein the step of introducing water includes filtering said water through a baffle to reduce air bubbles.

29. A method as in claim 26 wherein the step of confining said fish comprises placing said fish face-down in a vertical manner.

30. A method as in claim 26 wherein the step of confining said fish comprises placing said fish in a horizontal manner.

31. A method as in claim 26 further comprising:
   providing an adapter tube having an outer diameter smaller than said first inner diameter; and
   disposing said adapter tube within said tube to confine a small fish having a largest cross-sectional diameter substantially smaller than said first inner diameter.

32. A method as in claim 26 further comprising blocking light from entering said tube to maintain said fish in a low light environment.

33. A method as in claim 26 further comprising adjusting a flow rate of said water according to a size of said fish.

* * * * *

UNITED STATES PATENT AND TRADEMARK OFFICE
CERTIFICATE OF CORRECTION

PATENT NO. : 5,220,880

DATED : June 22, 1993

INVENTOR(S) : Lance D. Alworth, et al.

It is certified that error appears in the above-identified patent and that said Letters Patent is hereby corrected as shown below:

Column 7, claim 21, line 12, "24" should read --14--;

Signed and Sealed this

First Day of February, 1994

Attest:

BRUCE LEHMAN

*Attesting Officer*    *Commissioner of Patents and Trademarks*